Aug. 29, 1950 S. W. WOODARD 2,520,520
MARINE MARKER
Filed Jan. 28, 1948
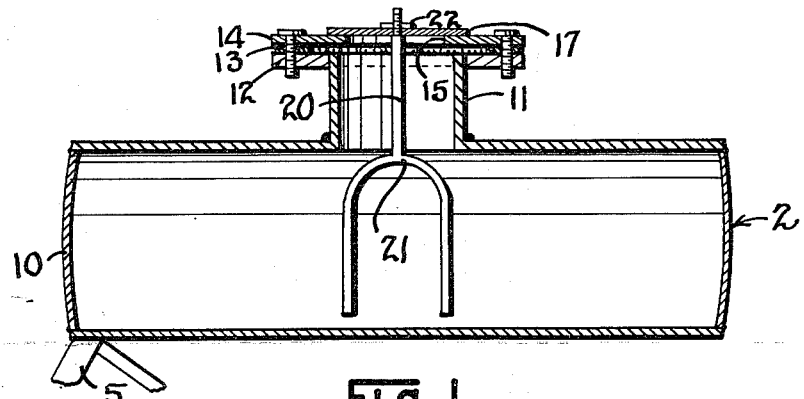
Fig. 1
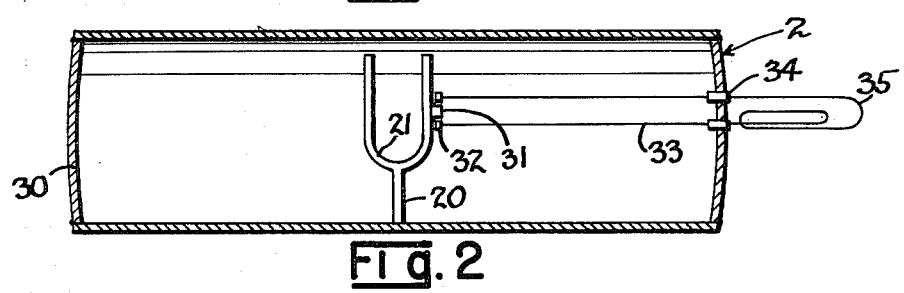
Fig. 2
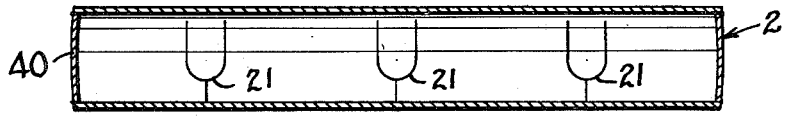
Fig. 3
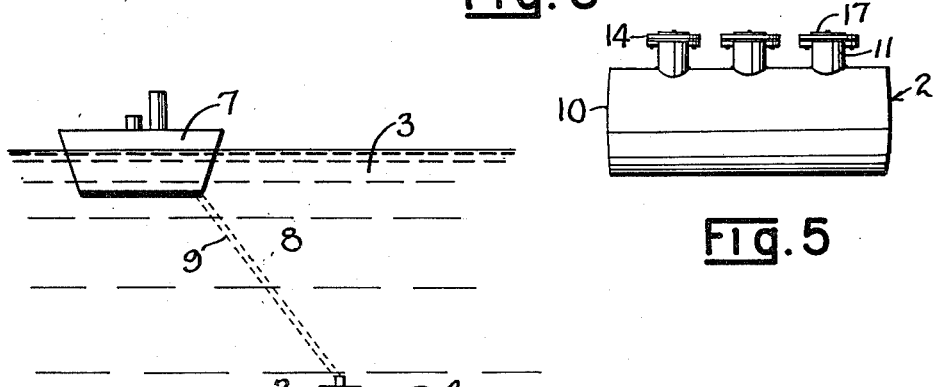
Fig. 4
Fig. 5
STANLEY W. WOODARD
INVENTOR.
BY Lester B. Clark
& Ray L. Smith
ATTORNEYS

UNITED STATES PATENT OFFICE 2,520,520

MARINE MARKER

Stanley W. Woodard, Houston, Tex., assignor to Dale Service Corp., Houston, Tex., a corporation of California Application January 28, 1948, Serial No. 4,862

1 Claim. (Cl. 177—385)

The invention relates to a marker and in particular to a submarine marker for repeatedly and accurately locating a predetermined point in a submerged area.

It is often necessary to return to a given point in a water covered area as where operations are to be carried out with sunken objects or where prospecting, drilling or production is to be had from subsurface geological structures. Unless such a point can be located from land positions, which is sometimes impossible and is often inconvenient, it is usually very difficult to accurately determine the location of the previously determined point.

Heretofore, it has been common practice to mark the point with a buoy, but this is disadvantageous in that the buoy may become loosened from its anchor, destroyed by contact from moving objects. Furthermore, the anchor for the buoy may drag or shift along the bottom due to tide and current movements, and in such case, the buoy would not give a true indication of the predetermined point. The presence of the buoy also creates hazards to the fishing industry and to navigation generally.

Sometimes a tower is erected in the water to mark a selected point. This is expensive and time consuming, presents hazards to the fishing industry and to navigation comparable to those mentioned above.

An object of the present invention is to provide a marine marker of which its location can be readily ascertained and which avoids the above enumerated difficulties.

Another object of the invention is to provide a marine marker which can be positioned on a submerged surface to mark a determined point.

Still another object of the invention is to provide a marine marker which can be positioned on a submerged surface to mark a determined point and which is responsive to applied energy to transmit a signal to indicate the location of the marker.

A still further object of the invention is to provide a marine marker which is capable of converting the energy received by it, from an energy impulse transmitted through a submerging medium, into a signal and retransmitting such energy signal to indicate the location of the marker.

The invention also comprehends a marine marker capable of being energized solely by an energy wave, or series of waves of a selected frequency, transmitted through the submerging medium so that such marker may thereafter transmit a signal through the medium because of having been energized so that such signal may be detected.

A further object of the invention is to provide a marine marker which can be positioned on a submerged surface for an indefinite period of time without requiring servicing or maintenance.

A still further object of the invention is to provide a marine marker which is easily constructed and which has a minimum of moving parts, but which can be readily detected when positioned upon a submerged surface.

The invention also comprehends a marine marker of simple design and which can be manufactured at a relatively low cost.

Other and further objects and advantages of the invention will become more readily apparent from a reconsideration of the following description and drawing wherein:

Fig. 1 is a vertical sectional view illustrating a unit to be submerged so that the unit may receive applied energy and transmit a signal so that the unit may be located.

Fig. 2 is a sectional view showing a modified arrangement whereby the unit may receive either electrical or mechanical energy and transmit corresponding signals as the result of such energizing.

Fig. 3 illustrates a multiple unit where a signal of greater volume is desired.

Fig. 4 is a schematic drawing illustrating a practical application of the invention.

Fig. 5 is a side elevation of a multiple unit constructed in accordance with the arrangement of Fig. 1.

Fig. 1 illustrates a unit 2 which is intended to be submerged in a liquid medium such as the body of water shown in Fig. 4. The subsurface 4 will receive and support the unit 2.

A practical application of the invention would be in locating a submerged point, possibly in subsurface prospecting work where a permanent marker in the water to locate a subsurface point is difficult to maintain.

In the present invention the unit 2 may be submerged and remain in position for an indefinite period.

When it becomes desirable to locate the unit suitable energy impulse may be transmitted to the liquid medium, or water.

Fig. 4 shows a ship 7 which is transmitting an energy impulse 8 through the water. This impulse will contact the unit 2 and in accordance with the following description the unit 2 will then discharge a return energy impulse or signal which is capable of being detected by suitable instruments on the ship 7. This general arrangement is merely schematic but it would appear that the ship 7 might travel the water area generally. It could either continuously or periodically transmit the suitable energy impulses and when a return signal was detected it would then be convenient to locate the position of the marker.

Broadly, the invention contemplates therefore a unit capable of being submerged which will receive energy impulses through the water and convert such energy into a detectable signal, so that the source of such conversion, namely, the marker, can be readily detected.

In Fig. 1 a housing 10 is illustrated as a relatively rigid hollow member, such as a cylinder, which may be provided with a dome 11. The flange 12 of the dome receives a gasket 13 and a clamping plate 14 which has the opening 15 therein. The diaphragm 17 is used to span the opening and is capable of vibration by the application of the energy impulses thereto. This diaphragm 17 is capable of withstanding the pressure of the water, as seen in Fig. 4, but must be capable of vibration due to applied energy impulses. Such energy impulses may be created in any desired manner, one form being an explosion within the water. Another method is to create a series of compressional waves of the proper frequency with an underwater sound generator.

The diaphragm 17 has the handle, or stem, 20 of a tuning fork 21 connected thereto by the nut so that the tuning fork is suspended inside the housing 10. The diaphragm and tuning fork are of such dimensions that they both have the same natural frequency under the operating conditions of the marker. Vibration of the diaphragm caused by applying energy impulses will consequently set up resonance vibration of the tuning fork. When the energizing impulses cease the fork will continue to vibrate and energy waves will be transmitted through the diaphragm to the water in the form of a signal which may be detected. The housing 10 is of such dimensions that the air column enclosed in it has the same natural frequency as the tuning fork and diaphragm.

It seems obvious from the foregoing explanation of the unit that it will serve as a submerged marker which may be readily located by mere procedure of transmitting an energy impulse or wave and receiving the resulting signal to which such energy wave has been converted by the unit.

Fig. 2 shows a modified arrangement of the unit wherein the housing 30 is of such material that the housing itself may be utilized as the diaphragm. The tuning fork 21 has the stem 20 thereof affixed to the housing, or diaphragm. The tuning fork and housing are of such dimensions that they both have the same natural frequency under operating conditions, so that vibration of the housing will set up vibrations in the tuning fork. This marker may be used in exactly the same way as the marker illustrated in Fig. 1. In using the markers described thus far, energizing impulses are applied and then stopped. The signals from the marker persist after such stopping so as to be capable of reception because of the tuning fork.

It may be desirable under certain conditions to be able to transmit the energizing impulses to and receive the signal from the marker simultaneously. A marker making this possible is illustrated in Fig. 2 in which a permanent magnet 31 is affixed to the tuning fork and has the induction coil 32 (shown in section) disposed adjacent thereto. This coil is connected into the circuit 33 which passes through the insulators 34 to the exterior of the housing. The circuit 33 is in the form of a loop 35 outside of the unit. With this arrangement current of the proper frequency may be induced in the loop 35 which will cause the magnet 31 to oscillate in and out of the coil 32, and thus set the tuning fork 21 into vibration. The vibration of the tuning fork will give off a mechanical vibratory signal. With this arrangement an electrical impulse is thus converted into a mechanical signal. On the other hand, a mechanical impulse such as explained in connection with Fig. 1 may set up vibration of the tuning fork and the magnet 31, which may then induce potential in the coil 32 and the loop 35 so that the loop may then be located by any suitable search coil. Since the energizing impulses and the resulting signal from the marker are of two different types of energy there will be no interference between them and both the energizing of the marker and the receiving of the signal from the marker may be done at the same time. While the electrical-mechanical combination is illustrated with the marker of Fig. 2, it is obvious that the same combination could, if desired, be used in connection with the marker shown in Fig. 1.

Fig. 3 shows an arrangement where a plurality of tuning forks 21 have been illustrated and the housing 40 will serve as the diaphragm.

Fig. 5 shows a modification of Fig. 1 where a plurality of domes 11, each carrying a diaphragm 17 have been illustrated.

It may be noted that with the arrangement of Figs. 1 and 5 the most efficient signal would be transmitted after the dissipation of the received energy because the transmitted signal from the diaphragm 17 might be masked by the incoming energy.

Broadly, the invention in one form contemplates the receiving and transmission of energy impulses by a submerged unit so that the unit may be located due to the fact that the unit contains a means for transforming the received energy into a transmitted signal which is prolonged sufficiently so that the unit may be detected. In another form the invention contemplates the receiving and transmission of energy impulses by a submerged unit so that the unit may be located due to the fact that the unit contains a means for converting the received energy into another type of energy enabling the transmission of energy to the unit and the receiving of a signal from the unit simultaneously.

In the foregoing description a tuning fork is used as part of the vibrating system of the marker. However, it is used here to represent any of several vibrating elements which could replace it and still get the same results. For example, a vibrating bar, or rod, could be employed so that the same results are obtained.

What is claimed is:

A submarine marker to receive and transmit impulses with a view of relocating such marker when it is submerged in a water covered area consisting of, a hollow closed and sealed housing of a weight and size to be deposited and abandoned upon the bottom of a water covered area, said housing containing a body of gaseous fluid, and a tuning fork affixed to the wall of said housing, the dimensions of the housing and fork being such that the tuning fork and gaseous body have resonance at the same frequency, the portion of the wall of the housing to which said fork is attached being flexible to transmit vibratory energy from the water to said fork, said dimensions being such that the vibrations of the fork and gaseous body persist for considerable time after the incoming vibratory impulse has ended, whereby the location of the marker may be determined by acoustic detection.

STANLEY W. WOODARD.

REFERENCES CITED

The following references are of record in th file of this patent:

UNITED STATES PATENTS

| Number | Name | Date |
|---|---|---|
| 506,150 | Blake | Oct. 3, 189 |
| 1,450,287 | Hahnemann | Apr. 3, 192 |
| 1,610,779 | Hewett | Dec. 14, 192 |
| 1,709,377 | Sperry | Apr. 16, 192 |
| 2,361,177 | Chilowsky | Oct. 24, 194 |
| 2,401,955 | Olson et al. | June 11, 194 |
| 2,461,181 | Rosenberg | Feb. 8, 194 |